United States Patent [19]

Lippel

[11] Patent Number: 5,652,624
[45] Date of Patent: Jul. 29, 1997

[54] SYSTEMS FOR DITHER-QUANTIZING AND RECONSTRUCTION OF DIGITAL TELEVISION SIGNALS

[76] Inventor: Bernard Lippel, 39 Fairway Ave., West Long Branch, N.J. 07764

[21] Appl. No.: 329,198

[22] Filed: Oct. 26, 1994

Related U.S. Application Data

[63] Continuation-in-part of Ser. No. 88,081, Jul. 7, 1993, abandoned, which is a continuation-in-part of Ser. No. 527,275, May 23, 1990, Pat. No. 5,253,045, which is a continuation-in-part of Ser. No. 461,009, Jan. 4, 1990, Pat. No. 5,148,273, Ser. No. 282,471, Dec. 9, 1988, abandoned, Ser. No. 180,344, Apr. 11, 1988, abandoned, and Ser. No. 779,254, Sep. 23, 1985, Pat. No. 4,758,893.

[51] Int. Cl.$^6$ .................................................. H04N 7/26
[52] U.S. Cl. ........................ 348/390; 348/574; 386/1; 386/46
[58] Field of Search ............................... 348/390, 472, 348/574, 720; 341/141; 358/310, 335; H04N 7/26

[56] References Cited

U.S. PATENT DOCUMENTS

| | | | |
|---|---|---|---|
| 3,739,082 | 6/1973 | Lippel | 348/574 |
| 4,447,803 | 5/1984 | Crosby | 348/574 |
| 4,460,924 | 7/1984 | Lippel | 348/574 |
| 4,758,893 | 7/1988 | Lippel | 248/574 |
| 5,148,273 | 9/1992 | Lippel | 348/390 |
| 5,253,045 | 10/1993 | Lippel | 348/720 |

*Primary Examiner*—Howard W. Britton

[57] ABSTRACT

Recording of the stream of very coarse samples with which a preferred multiphase dither-quantizer sends compressed television permits multiple playback modes for reconstructing an archival TV picture with different tradeoffs between contrast resolution and blurring due to image motion. A real-time receiver can be arranged to change mode automatically pel-by-pel, thereby adapting locally to rates of change in the picture detail. For better resolution of contrast in combination with spatial resolution, both transmitter and receiver can be modified so that only a stipple component is averaged to recover decimated gray levels and a major fraction of the gray scale is refreshed every frame.

15 Claims, 8 Drawing Sheets

SYSTEMS FOR DITHER-QUANTIZING AND RECONSTRUCTION OF DIGITAL TELEVISION SIGNALS

This application is a continuation-in-part of my application Ser. No. 08/088,081 (now abandoned) entitled "Systems for Dither-Quantizing, Storage and Decompression of Digital Television", filed Jul. 7, 1993 as a continuation-in-part of application Ser. No. 07/527,275 (now U.S. Pat. No. 5,253,045), entitled "Interpolating Finer Intensity Levels in Dither-Quantized Television Pictures", filed May 23, 1990 as a continuation-in-part of application Ser. No. 07/461,009, filed Jan. 4, 1990, (now U.S. Pat. No. 5,148,273); also of applications Ser. No. 07/282/471 filed Dec. 9, 1988 and Ser. No. 07/180,344, filed Apr. 11, 1988, (both now abandoned) and of application Ser. No. 06/779,254, filed Sep. 23, 1985 (now U.S. Pat. No. 4,758,893).

The invention relates to improvements in television systems transmitting or storing a video signal by means of coarsely quantized digital samples that may be changed to finer samples in a subsequent receiver. Exemplary applications include recording and viewing of surveillance TV in stores, banks, etc.; recording and viewing of animated images captured by unattended vehicles or probes; reduction of channel capacity in TV transmission systems; and digital camcorder systems.

Although conveniently described herein in terms of the luminance signal and gray scale of a black-and-white TV system, persons skilled in the art will understand that the invention also applies to chrominance components of the NTSC and similar color systems, as well as to various other systems of color TV such as those exemplified in U.S. Pat. No. 4,652,905 and FIG. 14 of U.S. Pat. No. 4,758,893.

Dither-quantized TV of the invention is sent sample by sample in real time, using a transmitter that operates non-adaptively and does not require motion compensation or data buffering, By utilizing explicit information found in ensembles of coarse samples, many of the intensity levels decimated by coarse quantization can be subsequently restored in a receiver to improve picture quality. The dither-quantizer of FIG. 1 (using any multiphase dither), together with the receiver of FIG. 8, exemplify one species of systems embodying the invention. The same dither-quantizer using SIMD and the receiver of FIG. 3 exemplify another species of systems. A third species is exemplified by the dither-quantizer of FIG. 5 in combination with the receiver of FIG. 6.

Although the dither-quantizers of FIGS. 1 and 5 are arranged for digital inputs, persons skilled in the art will understand that it may be preferable for systems of the invention to employ analog dither quantizers of prior art when the input video signal is presented in analog form.

DRAWINGS

Figure 4:
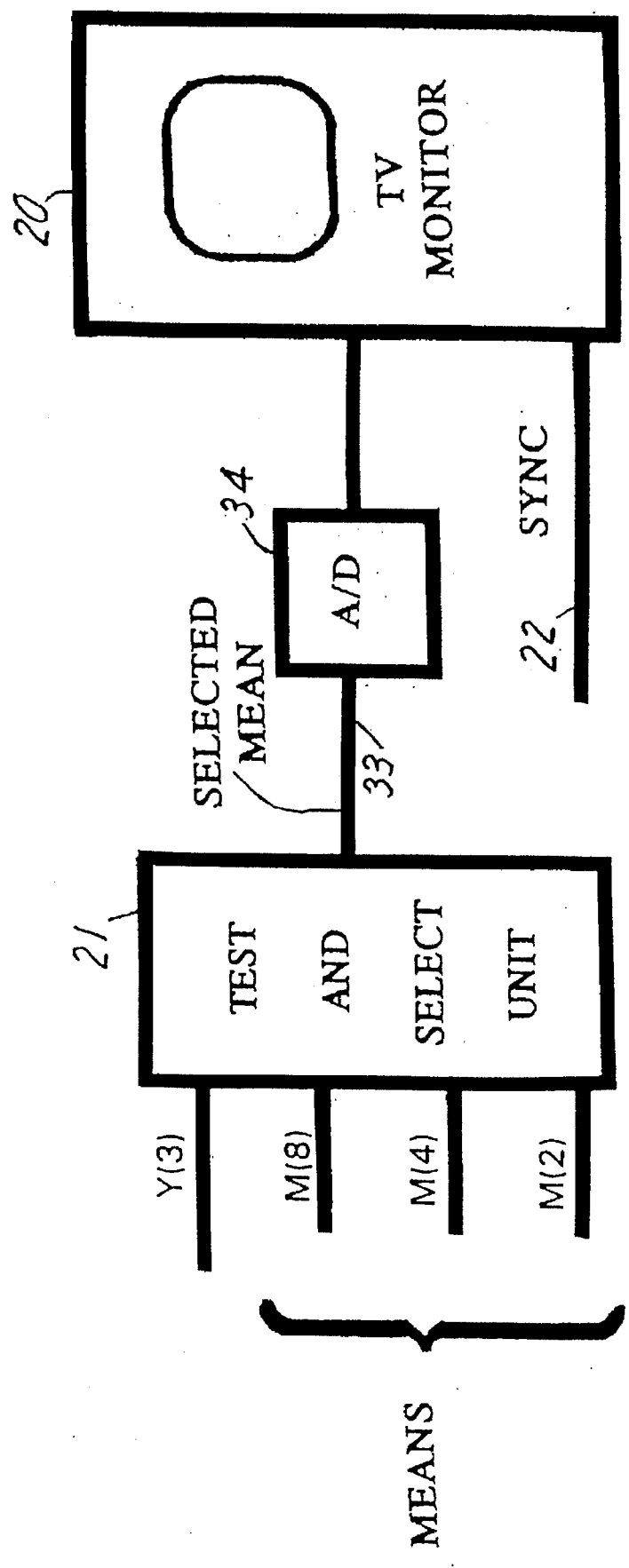

FIG. 4 exemplifies means whereby the reconstruction of displayed picture detail can be automatically and continuously adjusted in relation to activity in the detail.

Figure 5:
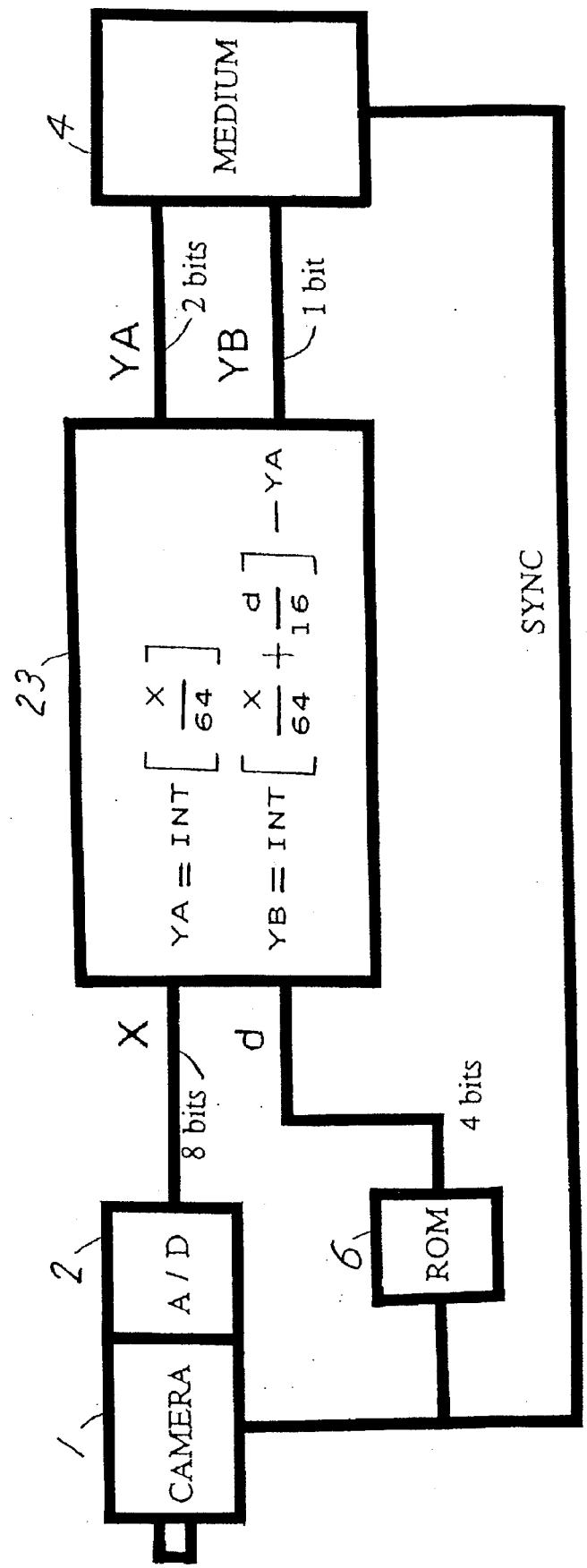

FIG. 5 illustrates schematically another method of dither-quantizing a television picture by digital means.

Figure 6:
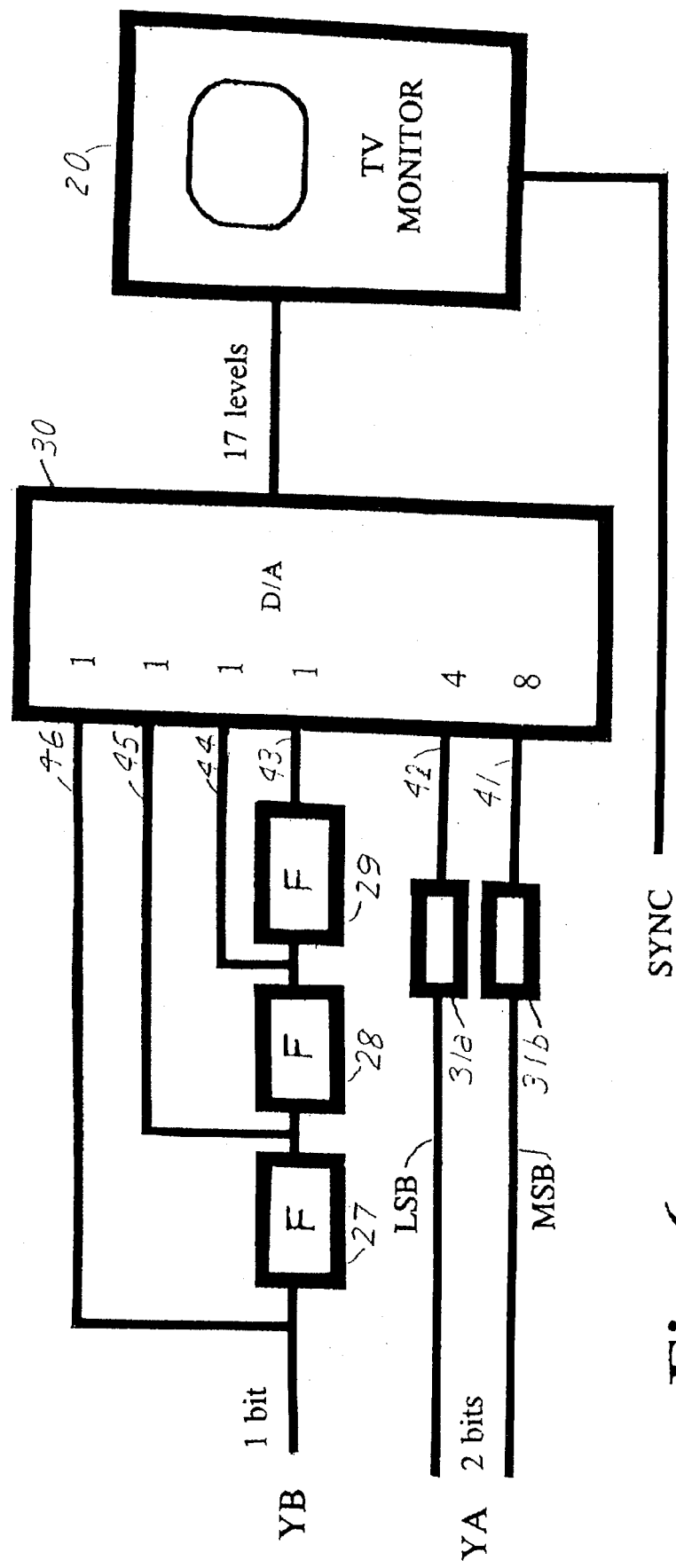
Figure 7:
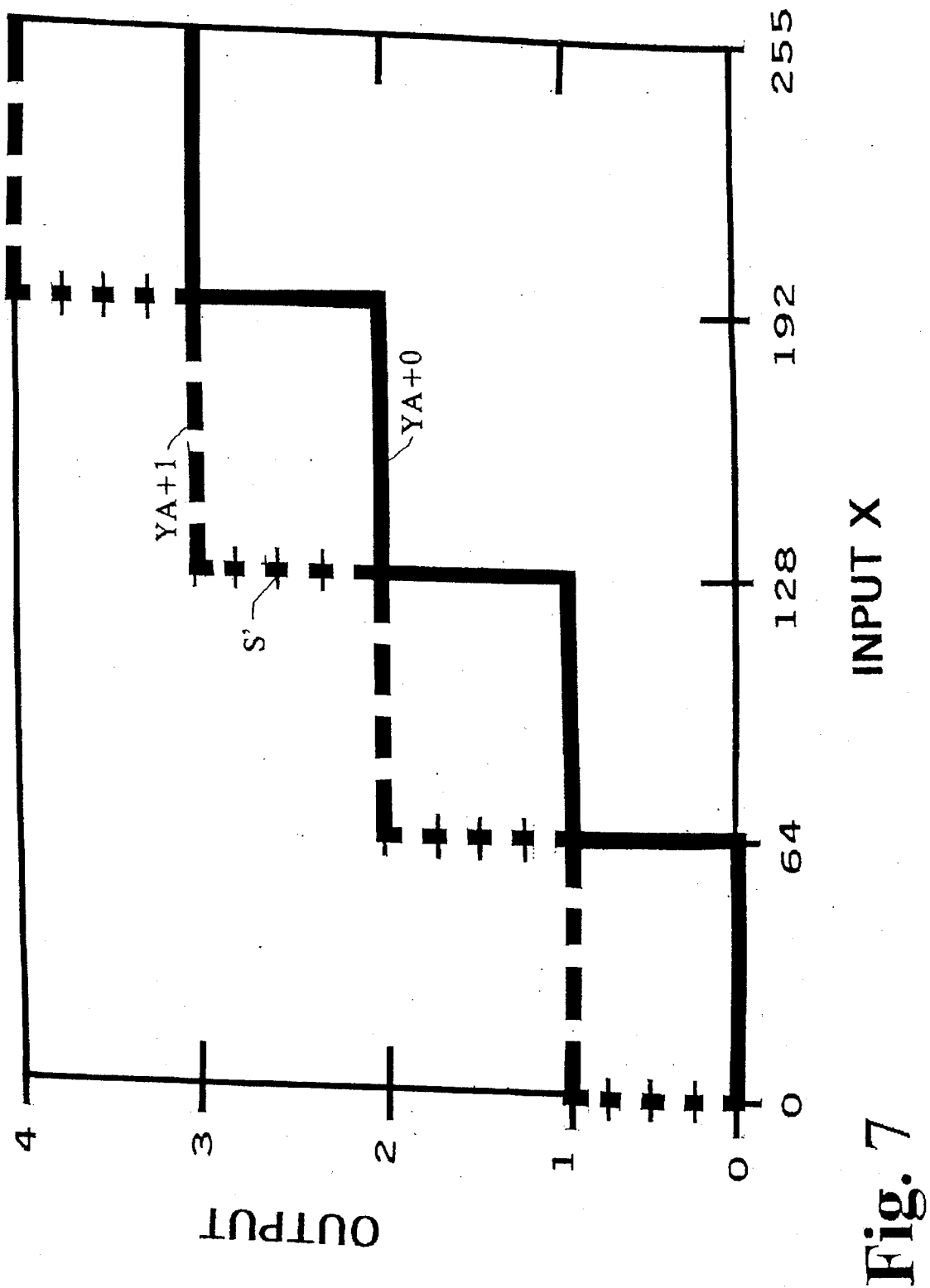

FIG. 6 shows schematically means for reproducing and displaying a television picture dithero-quantized as in FIG. 5, FIG. 7 is an input-output diagram pertaining to the dither-quantizing means of FIG. 5.

Figure 8:
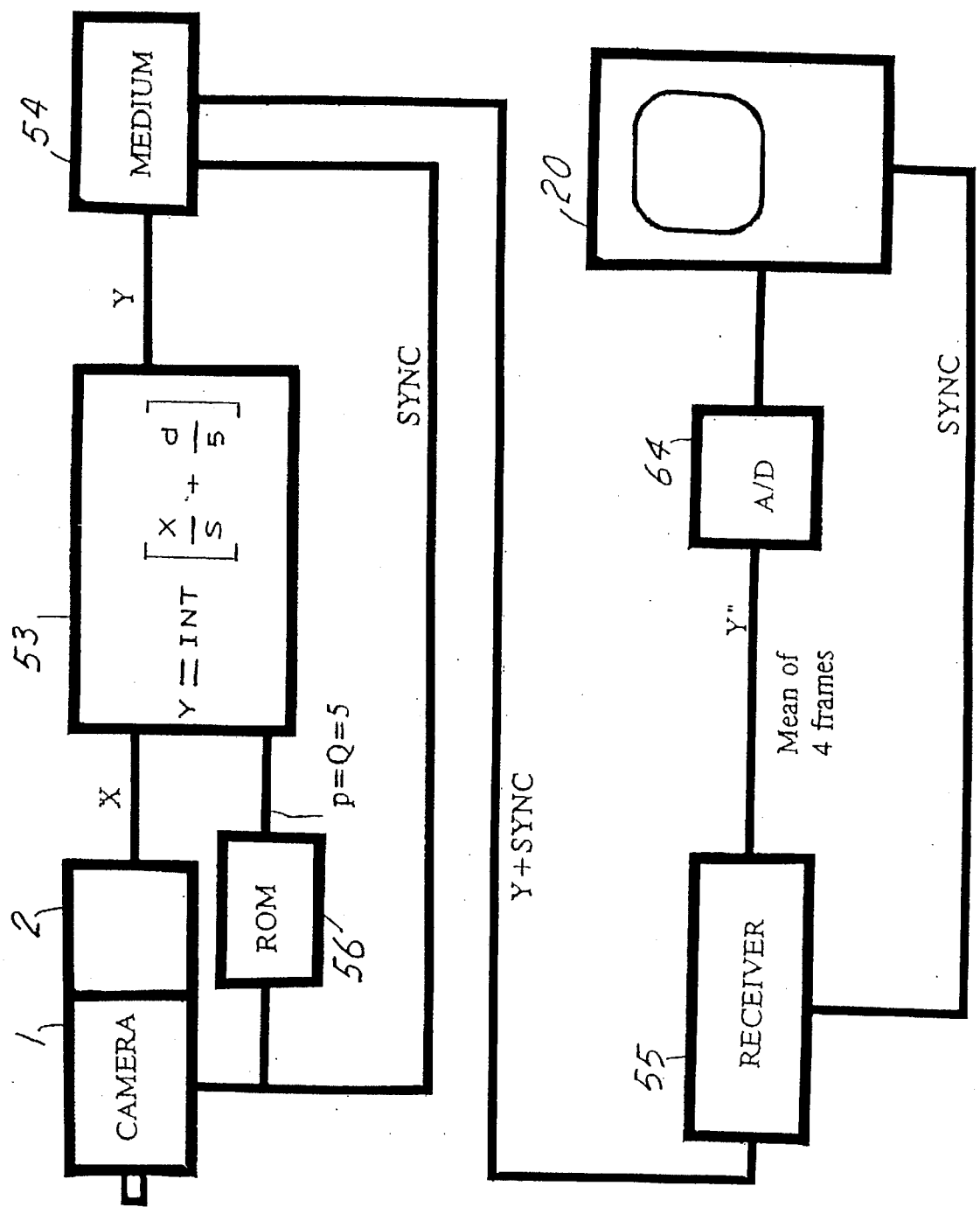

FIG. 8 shows schematically a method of reconstructing a dither-quantized TV picture when the dither is not necessarily SIMD dither.

DETAILED DISCLOSURE

Dither-Quantizing with a Look-Up Table

Figure 1:
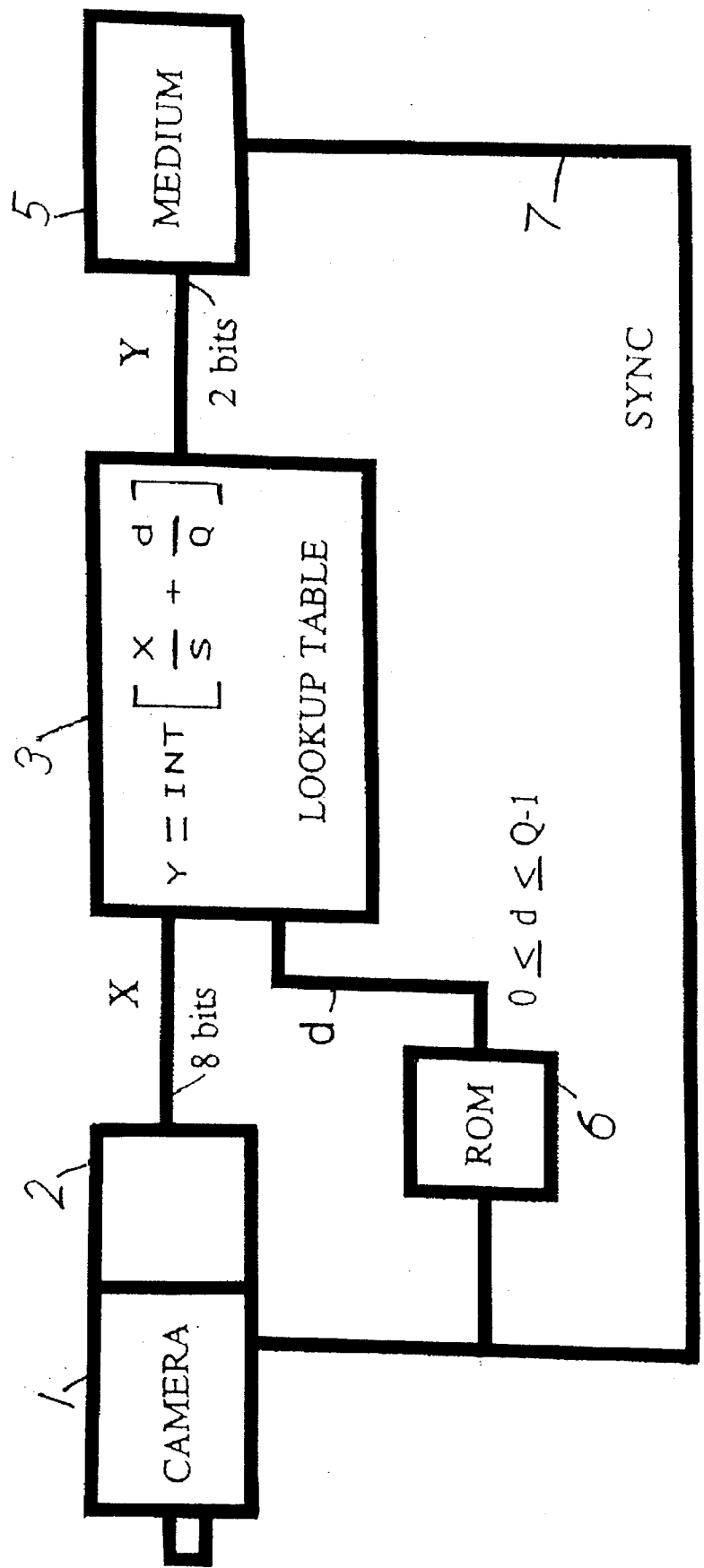
FIG. 1 illustrates schematically one method of dither-quantizing by digital means a television picture to be recorded or transmitted by means of digital samples.

FIG. 1 exemplifies schematically digital dither-quantizing means for compressing the 256 levels of the 8-bit gray scale into 2-bit samples representing only four gray levels. Camera 1 and associated digitizing circuitry 2, both of prior art, furnish a digital signal comprising a stream of 8-bit luminance samples, corresponding to 256 gray levels denoted 0 to 255 inclusive. ROM 6 has a pre-recorded arrangement of dither samples having Q sizes, from 0 to Q−1, and p phases. Dither samples are read out from the ROM in synchronism with clocking, line sync, and frame sync from camera 1, so that a predetermined dither size is associated with each pel of a TV picture, and the pel is paired with a different size from frame to frame until the entire cycle repeats after p frames.

Successive luminance samples, X, each paired with a dither sample having size d, enter a look-up table 3. The latter delivers a 2-bit number, Y, that quantizes X according to:

$$Y = INT[X/S + d/Q] \qquad (Eq.1),$$

where Y has integer values from 0 to 3 inclusive INT signifies the integer part of the bracketed quantity, and the step, S, equals $255/3$, corresponding to equal steps between the successive levels 0, 1, 2 and 3. (In the general case wherein X is between 0 and $X_{max}$ and Y goes from 0 to N−1, $S = X_{max}/[N-1]$.)

Inasmuch as luminance sample X does not generally contain a whole number of steps, let the exact value of X/S be A+E, where A is an integer and E is a fraction less than unity. Then $$Y = INT[A + E + d/Q]$$
$$= A + B$$

where A=INT [X/S] and B=INT [E+d/Q].

Inasmuch as both E and d/Q are less than unity, B must be either 0 or 1 and the necessary condition for B=1 is $QE \geq Q-d$; this is equivalent to INT $[QE] \geq Q-d$ because both Q and d are integers. We therefore define G to be INT [QE] and write $$Y = INT[X/S] + INT[(G+d)/Q] \qquad (Eq. 2)$$

Persons skilled in the art will perceive that A is the quantizer output when d=0 and that, if we divide the step S into Q equal substeps, G is the number of whole substeps in E.

A stream of 2-bit samples from LUT 3 goes to medium 5 of FIG. 1, which may be a transmission medium for the TV picture or a recording medium for the same.

Quantizing with p=Q Dithers

One class of improved systems of the invention dither-quantizes in the transmitter with multiphase dither having equal number of phases and dither sizes, i.e. p=Q. Consider the example of the dither-quantizer of FIG. 1 operating with 4 dither sizes: Since N=4 and Q=4, S=85 and $$Y=INT [X/8.5]+INT [(G+d)/4] \qquad \text{(Eq. 2a)}.$$

Possible values of G run from 0 to 3 inclusive, and ROM 6 supplies each pel of the TV raster with dither sizes d=0, 1, 2, and 3, not necessarily in that order, during the course of any four successive TV frames.

Figure 2:
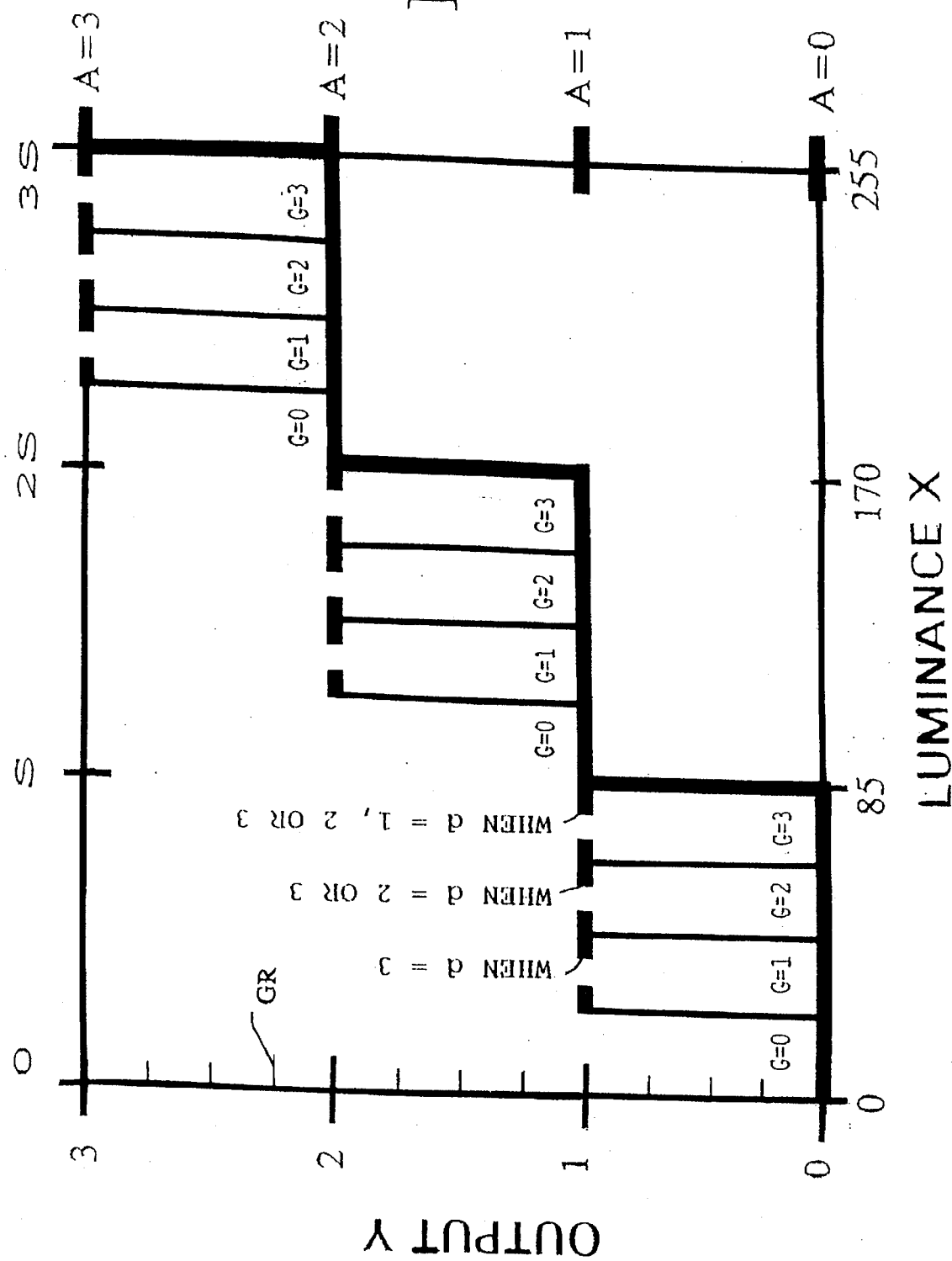
FIG. 2 illustrates input-output characteristics of the dither-quantizing means of FIG. 1.

FIG. 2 illustrates certain implications of Eq.2a. The X axis is divided into three segments, each containing 85 discrete gray levels (integer X values) and each divided further into four sections designated G=0, 1, 2 or 3. (Recall that G=INT [g]. The output Y is quantized at levels denoted A=0 to A=3. Level A=0 is marked with a heavy line for luminance values from 0 to S. Level A=1 is shown heavy from S to 2S and dotted from 0 to S; A=2 is heavy from 2S to 3S and dotted from S to 2S; A=3 is dotted between 2S and 3S.

If d=0, Y is just A, regardless of G. An X sample having luminance within a sub-range marked G=1 on FIG. 2, and also paired with dither size 3, is quantized to a level, A+1, corresponding to one of dotted lines; if the luminance is in a sub-range marked G=2, A+1 output results when d is either 2 or 3; and if the sub-range is marked G=3, d can be either 1, 2, or 3 for A+1 output. Note that A+1 occurs G times and A occurs 4-G times in any cycle of four successive frames: the sum of the four outputs is therefore 4A+G and their mean value is A+G/4. The mean remains constant until X changes, so these is no stippling.

Since the foregoing reasoning applies for every pel of the TV frame, nine gray levels (for example, the level marked GR at 2.25 on the Y axis of FIG. 2) are restored when a TV receiver takes the running average of four successive frames. With the transmitted gray levels, A=0, 1, 2, and 3 included, thirteen different shades of gray can be displayed from the stream of 4-level samples in this particular case.

Restoration of Gray Levels

Figure 3:
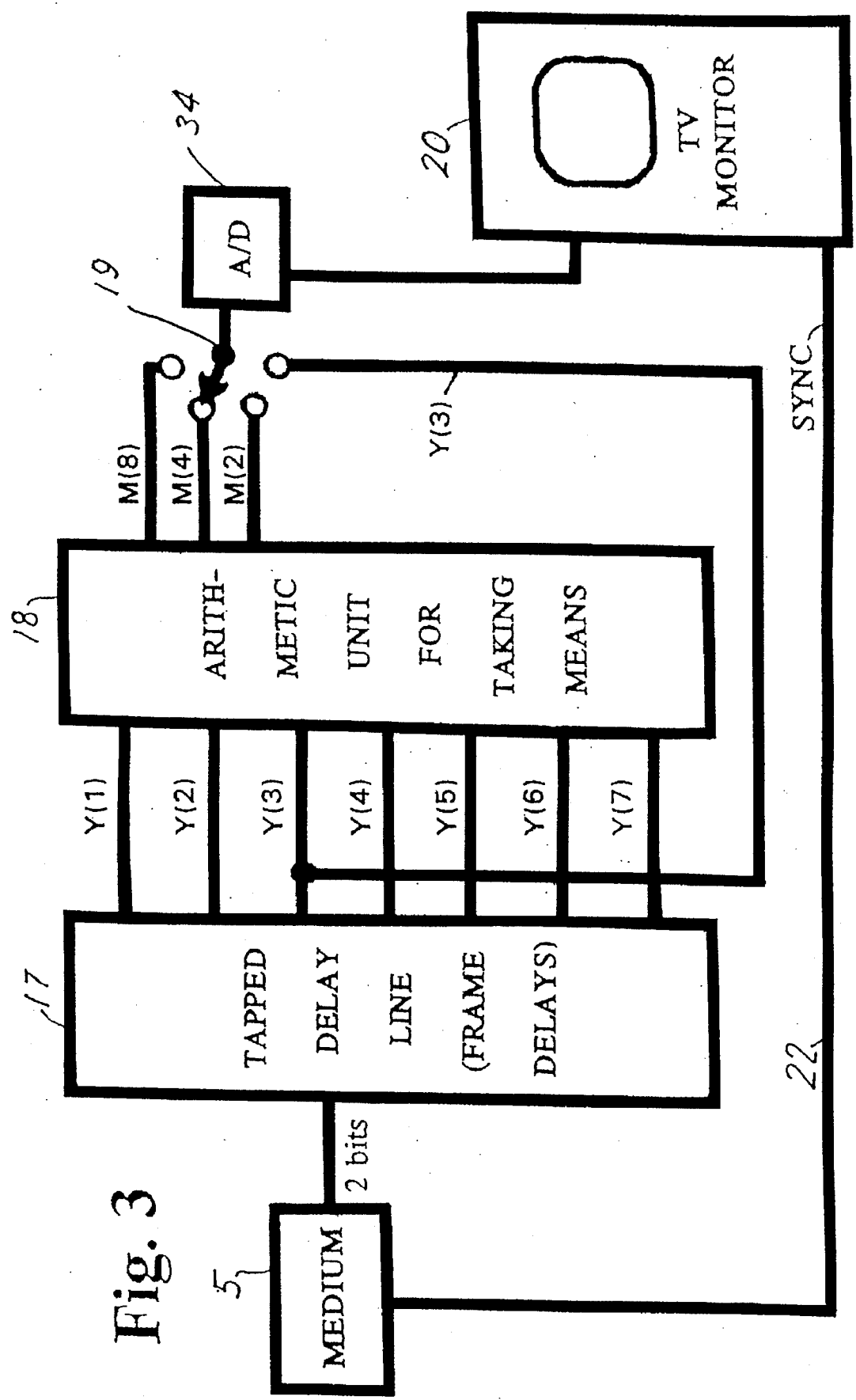
FIG. 3 represents schematically means for reproducing and displaying a television picture of FIG. 1, including means for displaying the picture reconstructed according to a selectable number of intensity levels.

The running average of pel luminance on a number of successive TV frames can be obtained in a TV receiver reproducer, using prior-art means disclosed in U.S. Pat. No. 5,253,045. Referring to FIG. 3 of the patent, for example, tapped delay line 32 receives a stream of 2-bit TV samples (from A/D of the figure) and sends four samples $Y_1$, $Y_2$, $Y_3$, and $Y_4$, corresponding to the same pel on four successive frames, to digital summing unit 33. The sum 39 goes to on D/A 45 whose analog output represents the mean of four frames. Such processing of each successive luminance sample as the TV picture is scanned generates a new stream of samples representing the running mean of four successive frames. FIG. 8 of the same patent shows record reproducer means for simultaneously playing back the luminance samples recorded for a particular pel on several successive frames. When the luminance signal is stored on a record, this is a suitable alternative to the tapped delay line 32.

In general, we may use any multiphase dither, and any convenient R such that p=Q=R, in order to divide each transmitted step into R substeps. Multiphase dither sizes at a given pel characteristically cycle through all R sizes during R successive frames; the order of sizes in the cycle (and even the pattern of sizes on a frame) is not critical.

Assuming specified N, and specified TV frame rate, a practical limit on R is set by the need to control blurring of a moving image. Using the conventional USA frame rate of 30 per second, four frames for R=4 occupy 0.133 sec. time, six frames for R=6 require 0.2 sec., and eight frames for R=8 require 0.266 sec. Assuming N=4 (2-bits/sample), the corresponding numbers of possible sub-steps (gray levels) are 13, 19, and 25.

Eliminating Contours

A TV picture, reconstructed as described above to have 13 gray levels, resembles one obtained directly from an undithered 13-level quantizer. As is well known, a still or moving picture quantized so coarsely (3.7 bits/pel) tends to show noticeable contouring in gradually shaded areas. Although increasing R or N may provide the solution for a particular application, the increased blurring or increase in required channel capacity is likely to be unacceptable, as a general rule.

The artificial contour lines on a picture quantized without dither and with too few levels are visible owing to the eye's enhanced contrast sensitivity for sharply defined boundaries. It is known that dithering the quantizer introduces oscillations (stipple) along the step boundaries that render the contours substantially imperceptible in such cases. Although stipple is superimposed over the entire TV display it is hard to perceive.

FIG. 8 is a schematic diagram exemplifying means for suppressing the visible contours. Camera, sync 7 and medium 5 may be the same as in FIG. 1 ROM 56 stores a 5-phase Q=5 dither arranged (preferably with ordered-dither frame patterns) so that every frame receives substantially equal numbers of all five dither sizes and the same cycle of five sizes repeats at all pels. LUT 53 provides an output sample Y, quantized accordingly to Y=INT(X/85+d/5), which is Eq. 1 when N=4 and Q=5. Y may be transmitted (or stored and reproduced) by means of medium 5, after which a prior-art receiver 55 generates, for every received frame, Y", the sum of four successive frames. A/D converter 64 receives Y" and furnishes to monitor 20 an analog signal scaled to the normal range of luminance-signal amplitudes.

The effect of accumulating four, rather than five, frames is to reconstruct the TV picture with 13 gray levels and also to superimpose animated stippling on the TV picture. The stipple dots have amplitude equal to a sub-step, like those from a 13-level quantizer dithered according to Eq. 2 and a picture reconstructed from the mean of 4 frames can be displayed with generally acceptable picture quality.

In general, the technique of FIG. 8 works when R frames are accumulated in the receiver while dither of the transmitter has p phases and Q sizes such that p=Q=R+1 or p=Q=R−1, p being an integer larger than unity.

Self-Interpolating Multiphase Dithers

In self-interpolating p-phase dithers of the referenced patents, p and Q are not necessarily equal, but they are integral powers of 2. Unless L, the number of accumulated frames, equals p, and provided that L is limited to specific values, SIMD's make possible a reconstucted picture that includes stipple having amplitude of one sub-step, emulating the direct output from an dithered quantizer delivering the same number of output levels. For 16-phase SIMD's having Q=16, acceptable values of L include 2, 4, 8, 12, 14, 15, and 16. The number of gray levels depends on L, the sub-step size being S/L.

An SIMPD permits the receiver to be adjusted to extract a preferred combination of gray-scale and spatial resolutions when a television scene includes images that might otherwise be blurred due to rapid motion.

Embodiment of FIG. 3

FIG. 3 exemplifies an embodiment of the invention arranged to permit choice of sub-step size during examination or analysis of television scenes dither quantized as shown in FIG. 1 when ROM 6 provides 16-phase self-intepolating dither with 16 dither sizes. Assuming that medium 5, also shown in FIG. 1, is a storage medium, a stream of 2-bit video samples reproduced therefrom together with sync signals 22 enters tapped delay line 17 which comprises seven one-frame delay units of prior art; it is akin to the tapped line with three frame-delay units shown in FIG. 3 of U.S. Pat. No. 5,253,045. Eight separate streams of digital video samples, designated Y(0) to Y(7) and scanning eight successive TV frames, are tapped off in parallel and, since these streams are all synchronous with the horizontal and vertical sync signals 22, any set of concurrent samples corresponds to the scanning of a particular pel of the TV raster during eight successive frames.

Arithmetic unit 18 receives streams Y(0) to Y(7) and computes three different running means, as follows: Mean M(8) having 25 gray levels is the sum of all eight samples divided by 8; Mean M(4) with 13 levels is the sum of Y(2), Y(3), Y(4) and Y(5) divided by 4; and M(2) with seven levels is half the sum of Y(3) and Y(4). A stream of samples from reproducer 16 (assumed to be Y(3)) and the three running means from unit 18 are delivered to switching unit 19, while sync 22 from the reproducer goes to TV monitor 20. The switching unit is arranged to allow selection of Y(3) or one of the running means as the input to D/A converter 34 which furnishes an analog video sample to TV monitor 20.

The scenes stored in medium 5 can be searched for material of interest merely by viewing the 2-bit video signal Y(3) directly; although impaired in quality, the 4-level TV pictures are easily recognizable as to subject. A scene of interest can then be selected for viewing from the M(8) tap or whichever other switch tap gives a preferred combination of motion resolution and image quality.

It will be understood that the choice of modes in FIG. 3 is purely exemplary and that various modifications can be made without departing from the spirit of the invention.

Test-and-and select unit 21 of FIG. 4 replaces switching unit 19 of FIG. 3 for automatic operation in a variation of the FIG. 3 arrangement. It is also useful in a receiver of a realtime signal from the transmitter. Unit 21 receives Y(3) from delay line 17 of FIG. 3 as well as M(8), M(4) and M(2) from arithmetic unit 18 and furnishes a video signal 33 to A/D converter 34 whose analog output goes to TV monitor 20. Following U.S. Pat. No. 5,253,045, unit 21 automatically chooses signal 33 to be M(8), M(4), M(2) or Y(3), in that order of preference, rejecting any mean that differs from the current Y(3) by more than one step of the 2-bit signal.

Persons skilled in the art will perceive that a sample is reconstructed independently for each pel the TV frame. The pels belonging to stationary picture details (and some occurring fortuitously in moving detail) are displayed from M(8) with 25 shades of gray. A sample is rejected when the pel luminance is judged to have changed excessively during the averaging period; this calls for taking the mean of fewer frames, or even displaying the 4-level sample Y(3) if necessary, in order to minimize blurring of a moving image: the fewer frames in the average, the greater the rate of image motion tolerated, and the fewer the number of gray levels restored. Such trade-off of gray scale (and contrast resolution) for temporal resolution tends to conform to the perceptual characteristics of the human visual system.

Separate Base and Stipple

FIGS. 5 and 6 exemplify an alternative form of the invention that tolerates more motion during the accumulation of a given number of frames. The transmitter shown in FIG. 5 has the same camera 1 and digitizer 2, but lookup table 23 and medium 5 are modified versions, and ROM 6 provides 16-phase SIPMD. The lookup table receives inputs X and d as in FIG. 1 and delivers to medium 4 two outputs, YA and YB, as follows:

$$YA = INT\ [X/64] \qquad \text{(Eq.3a)}$$

$$YB = INT\ [X/64 + d/16] - YA \qquad \text{(Eq.3b)}$$

it can be seen that YA, which can be obtained without dither, is the whole number of steps in X, while YB results from dither-quantizing the residual step fraction into one step or no steps. In order that YA shall include all four combinations of two bits, the system step size is 256/(5−1), or 64. This is also diagrammed in FIG. 7 where YA+0 is shown with heavy lines and YA+1 with dotted lines; inasmuch as YB can be either 0 or 1, YA+YB has five possible values.

The receiver system of FIG. 6 receives a stream of 2-bit base samples YA and, synchronous therewith a stream of 1-bit stipple samples YB. YB enters the tapped delay line consisting of frame-delay units 27, 28 and 29 and also goes to input 46 of A/D converter 30. The YB stream, delayed by one TV frame period, is tapped off between units 27 and 28 and goes to input 45 of the converter. Likewise, YB delayed two frames is tapped off between delay units 28 and 29 and connected to input 44 of the converter and YB, delayed by three frames, goes from the output of delay unit 29 to input 43 of the converter. Assuming that YA samples have the two bits in parallel, FIG. 6 shows a double line transmitting a double bit stream to A/D converter 30 with the more significant bit going to converter input 41 and the less significant bit to converter input 42. It is preferred that YA samples to the converter be delayed one frame period by delay units 31a and 31b.

Converter 30 is constructed in accordance with prior art so that input 41 has weight 8, input 42 has weight 4, and each of inputs 43 to 46 has unit weight. Hence, corresponding to any set of YA and YB samples, an analog video sample corresponding to one of the seventeen gray levels 0 to 16 is supplied by A/D converter 30 to TV monitor 20; and, corresponding to the next set of reproduced samples, another such video sample is presented. Horizontal and vertical scanning in the monitor, synchronized to the camera scanning by means of sync signal 22, results in a 17-level monochrome television display.

Because the self-interpolating dither of FIG. 5 has more phases than the number of samples over which YB is averaged in FIG. 6, the luminance displayed at a pel may oscillate between two successive levels, like the stipple on a TV picture that has been only dither-quantized with seventeen levels in the transmitter of FIG. 1, without frame averaging in a receiver.

The arrangement of FIG. 5 requires three bits to encode 5-level samples as YA+YB, which is inefficient compared with two bits for 4-level Y samples in FIG. 1. However, as TV monitor 20 of FIG. 6 generates each pel of the TV picture from the current YA sample and the mean of four successive YB samples, at least the base picture from YA samples is refreshed frame by frame and, although the YB image may be blurred, its contrast is relatively low. In the system of FIG. 3, on the other hand, both base and stipple components are susceptible to blurring.

Returning to FIG. 7, averaging according to FIG. 6 divides each YB step into four sub-steps, indicated by S'. It can also be seen that YB contributes at most 25% of the full gray scale. Hence, the more contrasty a moving edge, the more important its YA component and the more sharply it is likely to be displayed.

Persons skilled in the art will perceive that I may also quantize in FIG. 5 using a step interval of 128, so that both YA and YB are 1-bit samples. Averaging YB over eight frames, instead of four, and assigning weight 8 to YA in a D/A converter and unity weight to each of eight YB inputs, will again result in seventeen output levels despite only two bits in YA+YB. A penalty is the increased contribution from YB to image contrast at the same time that the number of frames entered into the mean YB is doubled, increasing the likelihood of blurring in lower-contrast picture edges.

COMMENTS

U.S. Pat. No. 5,253,045 discloses means whereby the function of a frame-delay line such as unit 17 of FIG. 3 can be performed in suitably modified reproducing devices, obviating need for an actual delay line in embodiments of the invention that involve recording and reproducing equipment.

It will be clear to those having normal skill in the art that the invention may be practiced with values of N other than the exemplary values used in this disclosure.

Wherever the disclosure has described taking the mean of samples from several TV frames to determine a single pel for monitor 20, it will be understood that the next pel is determined likewise from a next set of frames.

The term reconstruction as used herein includes partial restoration of decimated gray levels. Animated stippling on TV pictures reconstructed according to the invention, while not necessarily perceptible itself, enhances the perceived picture quality as if many more gray levels were restored.

Although embodiments storing and processing binary digital numbers have conveniently been disclosed, the invention should not be construed as limited to binary notation or binary signalling.

While this invention has been described in connection with several embodiments and specific examples thereof, it will be understood that many modifications and variations thereof will be readily apparent to persons having ordinary skill in the art and that this application is intended to cover any adaptations or variations thereof. Therefore, it is manifestly intended that this invention be limited only by the claims and the equivalents thereof.

I claim:

1. A system for generating digital television, for storing the television information in compressed digital form and for displaying a reconstructed picture from the stored record, comprising:

Means for acquiring a first stream of digital samples sufficient for display of a television scene, each sample a G-bit binary number, G an integer;

Means for generating a sequence of numbers corresponding to dither samples such that every sample of said first stream is paired with one dither sample;

Means for addressing, according to the numerical values of a G-bit sample and its paired dither sample, digital data stored in a digital lookup table and for accordingly extracting a K-bit binary number from the lookup table, K an integer less than G, and for replacing, in its turn, each G-bit sample of said first stream with the K-bit sample pertaining to it, thereby generating a second stream of samples consisting of K-bit numbers;

Means for storing and reproducing said second stream of samples;

Means for obtaining the arithmetic mean value of plural samples of said second stream related by correspondence to the same picture element on a like plurality of successive television frames;

Means for generating a third stream of digital samples wherein each K-bit sample of said second stream is replaced by a the mean value of a set of related samples; and Means for displaying a televising picture according to said third set of samples.

2. Apparatus for compressing a television signal, said signal represented by a stream of digital input samples quantized according to a larger number of permitted levels, said apparatus producing a dither-quantized signal comprising a stream of digital output samples quantized according to a smaller number of permitted levels denumerable by the successive integers from 0 to $2^p-1$ inclusive, p a positive integer; said apparatus comprising:

a) means for providing a stream of digital dither samples quantized according to predetermined sizes, including a size denoted 0;

b) means for pairing each input sample with a dither sample;

c) means incorporating digital storage means and delivering a dither-quantized output sample having one of the successive levels denumerable 0 to $2^p-1$ inclusive according to the level of the input sample and the size of the dither sample in a pair furnished to said means, said output sample being further restricted to the successive levels denumerable 0 to $2^p-2$ inclusive when the dither sample included in said pair has the size denoted 0; and d) means for transmitting a stream of output samples having $2^p$ levels corresponding to all possible combinations of p binary digits.

3. The apparatus of claim 2 providing said dither samples quantized according to Q different sizes, and wherein said digital storage means comprises a lookup table arranged so that Q equal input samples, each paired with a different size dither sample, result in Q output samples restricted to no more than two successive levels and having mean value corresponding to the value of said equal input samples quantized according to additional levels separated by Qth parts of the interval between said two successive levels.

4. The apparatus of claim 2 wherein said predetermined sizes in said stream of digital dither samples are arranged according to a self-interpolating multiphase dither pattern, and wherein said apparatus further comprises receiver means obtaining from said stream of dither-quantized output samples a stream of arithmetic mean samples corresponding to the running average of a predetermined number of successive television frames.

5. The apparatus of claim 4 further comprising means for storing a stream of dither-quantized output samples and for playing back said stream of mean samples to display a picture decompressed to an elective degree determined by the number of successive frames chosen for said running average.

6. Apparatus receiving a television signal represented by a stream of digital input samples quantized according to finer steps and delivering a pair of first and second output samples corresponding to each input sample; said apparatus including:

a) means for requantizing an input sample without dither to provide a first output sample quantized according to an integral number of coarser steps uniformly larger than said finer steps;

b) means for providing a stream of dither samples synchronous with said input samples; and c) means for providing a stream of second output samples wherein amplitudes are quantized to only zero or one of said coarser steps, the stream also such that the sum of the coarser steps in the first and second output samples relating to a particular input sample is equivalent to said particular input sample as dither-quantized with the dither sample synchrounous thereto.

7. The apparatus of claim 6 wherein means for providing first and second output samples include means for accessing predetermined information stored in a digital record.

8. The apparatus of claim 6 having said stream of dither samples arranged according to a multiphase dither pattern with R dither sizes and R phases, R an integer greater than unity, and further comprising:

a) means combining sets of M second output samples, each sample quantized as zero or one coarser step and each set pertaining to M successive television frames, so as to generate a stream of mean samples wherein each sample is quantized according to sub-steps one-Mth the size of a said coarser step, M being an integer larger than unity and the absolute difference between M and R being no more than unity; and b) means for additively combining synchronous streams of said first output samples and said mean samples to obtain a stream of samples quantized according to said sub-steps.

9. The apparatus of claim 6 having said stream of dither samples arranged according to a self-interpolating multiphase dither pattern and further including means for receiving said streams of first and second samples, comprising:

a) means for transforming said stream of the second output samples quantized according to zero or one coarser step to obtain a stream of third samples quantized according to steps having uniform size corresponding to an aliquot part of a coarser step; and b) means for additively combining third samples and first output samples to obtain a stream of samples quantized according to the step size of said third samples.

10. The apparatus of claim 9 wherein said means for transforming includes means for obtaining the arithmetic mean of a specified sequence of second samples.

11. Dither-quantizing apparatus receiving a stream of input samples quantized according to a larger set of possible amplitudes and delivering two corresponding streams of output samples, both quantized according to the same smaller set of possible amplitudes, comprising:

means for providing a dither sample synchronous with each received sample; and means for converting a received sample and its synchronous dither sample into a pair consisting of a first output sample and a second output sample, the amplitude according to said first output sample being dependent on the amplitude of the received sample and independent of the size of the synchronous dither sample, and the amplitude according to said second output sample being dependent on the size of the synchronous dither sample and restricted to two values corresponding to zero and the lowest amplitude in said smaller set of possible amplitudes.

12. The apparatus of claim 11 wherein said means for converting a received sample and its synchronous dither sample to first and second output samples includes a digital lookup table.

13. Dither-quantizing apparatus according to claim 11 receiving a stream of data samples sufficient for television; providing a stream of dither samples arranged according to R sizes and R phases, R an integer larger than unity; and transmitting and receiving synchronous streams of output samples, including first output samples quantized according to a plural set of amplitudes and second output samples quantized to have only zero amplitude or the smallest non-zero amplitude of said plural set; said apparatus further comprising:

(a) means for obtaining the mean amplitude of a set of M samples corresponding to a specific picture element during M successive television frames and for converting the stream of second samples into a stream of averaged samples quantized according to M+1 possible amplitudes, M an integer larger than unity and the absolute difference between R and M not more than unity; and (b) means for providing a stream of output samples wherein the amplitude of a sample corresponds to the sum of a first output sample and an averaged sample synchronous therewith.

14. The dither-quantizing apparatus of claim 11 providing dither samples in Q discrete sizes and providing first and second output samples in such manner that a set of Q samples, received with equal amplitude and each synchronous with a dither sample of different size, is converted into Q identical first output samples and a set of Q second output samples such that the sum consisting of the amplitude of a first output sample and the mean amplitude of the set of second output samples corresponds to the amplitude of said received samples quantized according to successive amplitude levels separated by the Qth part of the interval separating two successive amplitudes in said smaller set of amplitudes.

15. Dither-quantizing apparatus according to claim 14 receiving a stream of input samples sufficient for television, the apparatus further comprising:

(a) means for transmitting synchronous streams of first and second output samples corresponding to said input samples and for receiving the same;

(b) means for sub-sampling the stream of second output samples to select a set of L samples pertaining to a specific picture element during L successive television frames and for obtaining their arithmetic mean value, L an integer greater than unity, and for obtaining likewise a stream of averaged samples, synchronous with the first output samples, wherein each averaged sample is the mean of L successive second output samples associated with a common picture element;

(c) means for providing a stream of final output samples wherein each sample corresponds in amplitude to the sum of a first output sample and the averaged sample synchronous therewith; and (d) means for converting said stream of final output samples into a television picture.

* * * * *